United States Patent
Woo et al.

(10) Patent No.: US 12,536,133 B2
(45) Date of Patent: Jan. 27, 2026

(54) METHODS AND CIRCUITS FOR STREAMING DATA TO PROCESSING ELEMENTS IN STACKED PROCESSOR-PLUS-MEMORY ARCHITECTURE

(71) Applicant: Rambus Inc., San Jose, CA (US)

(72) Inventors: Steven C. Woo, Saratoga, CA (US); Michael Raymond Miller, Raleigh, NC (US)

(73) Assignee: Rambus Inc., San Jose, CA (US)

( * ) Notice: Subject to any disclaimer, the term of this patent is extended or adjusted under 35 U.S.C. 154(b) by 14 days.

(21) Appl. No.: 18/624,877

(22) Filed: Apr. 2, 2024

(65) Prior Publication Data

US 2024/0311334 A1    Sep. 19, 2024

Related U.S. Application Data

(63) Continuation of application No. 17/410,786, filed on Aug. 24, 2021, now Pat. No. 11,960,438.

(60) Provisional application No. 63/075,501, filed on Sep. 8, 2020.

(51) Int. Cl.
   *G06F 15/80* (2006.01)
(52) U.S. Cl.
   CPC .................... *G06F 15/8061* (2013.01)
(58) Field of Classification Search
   None
   See application file for complete search history.

(56) References Cited

U.S. PATENT DOCUMENTS

| | | | |
|---|---|---|---|
| 9,508,607 B2 | 11/2016 | Chua-Eoan et al. | |
| 9,639,128 B2 | 5/2017 | Chun | |
| 10,915,297 B1* | 2/2021 | Halutz | G06F 17/153 |
| 11,079,936 B2 | 8/2021 | Chang et al. | |
| 11,093,418 B2 | 8/2021 | Nam | |
| 11,423,292 B2* | 8/2022 | Chang | G06F 9/30032 |

(Continued)

FOREIGN PATENT DOCUMENTS

| | | |
|---|---|---|
| CN | 107667425 A | 2/2018 |
| DE | 102022107232 A1 | 10/2022 |

(Continued)

OTHER PUBLICATIONS

Figueiredo, Renato, Speculative Distributed Shared-Memory Multiprocessors Organized as Processor-and-Memory Hierarchies, Aug. 2001. Purdue University. 24 pages.

*Primary Examiner* — Eric Coleman
(74) *Attorney, Agent, or Firm* — Silicon Edge Law Group LLP; Arthur J. Behiel

(57) ABSTRACT

A stacked processor-plus-memory device includes a processing die with an array of processing elements of an artificial neural network. Each processing element multiplies a first operand—e.g. a weight—by a second operand to produce a partial result to a subsequent processing element. To prepare for these computations, a sequencer loads the weights into the processing elements as a sequence of operands that step through the processing elements, each operand stored in the corresponding processing element. The operands can be sequenced directly from memory to the processing elements or can be stored first in cache. The processing elements include streaming logic that disregards interruptions in the stream of operands.

19 Claims, 9 Drawing Sheets

(56) References Cited

U.S. PATENT DOCUMENTS

| | | |
|---|---|---|
| 11,625,245 B2 | 4/2023 | Nurvitadhi et al. |
| 11,687,454 B2 | 6/2023 | Lee et al. |
| 2006/0004940 A1* | 1/2006 | Saito .................. G06F 15/7867 711/1 |
| 2008/0250092 A1 | 10/2008 | Montvelishsky |
| 2008/0270751 A1 | 10/2008 | Montvelishsky et al. |
| 2009/0103854 A1 | 4/2009 | Beausoleil et al. |
| 2009/0103855 A1 | 4/2009 | Binkert et al. |
| 2010/0157644 A1 | 6/2010 | Norman |
| 2014/0013185 A1 | 1/2014 | Kobla et al. |
| 2014/0168418 A1 | 6/2014 | Hess |
| 2014/0181417 A1 | 6/2014 | Loh et al. |
| 2016/0085721 A1* | 3/2016 | Abali .................... G06F 9/3001 712/15 |
| 2016/0351551 A1 | 12/2016 | Mei et al. |
| 2017/0278213 A1 | 9/2017 | Eckert et al. |
| 2017/0308381 A1* | 10/2017 | Zbiciak ................ G06F 9/3861 |
| 2018/0088904 A1* | 3/2018 | Lopez .................. G06F 1/3275 |
| 2018/0181503 A1* | 6/2018 | Nicol .................. G06F 13/1673 |
| 2018/0189184 A1* | 7/2018 | Zbiciak ............... G06F 12/0875 |
| 2019/0123023 A1 | 4/2019 | Teig et al. |
| 2019/0187983 A1* | 6/2019 | Ovsiannikov ........... G06F 17/15 |
| 2019/0259732 A1 | 8/2019 | Choo et al. |
| 2019/0317770 A1* | 10/2019 | Sankaralingam ..... G06F 15/825 |
| 2020/0184001 A1* | 6/2020 | Gu ......................... G06F 17/16 |
| 2021/0005527 A1 | 1/2021 | Choi et al. |
| 2021/0036110 A1 | 2/2021 | Thomas et al. |
| 2021/0055867 A1 | 2/2021 | He |
| 2021/0224195 A1 | 7/2021 | O |
| 2021/0225430 A1* | 7/2021 | O ........................ G06F 13/1668 |
| 2022/0004323 A1 | 1/2022 | Sun |
| 2022/0004489 A1 | 1/2022 | Cariello |
| 2023/0297269 A1 | 9/2023 | Dally et al. |

FOREIGN PATENT DOCUMENTS

| | | |
|---|---|---|
| EP | 1821200 A3 | 9/2008 |
| EP | 1998258 A1 | 12/2008 |
| WO | WO-2008-137142 A1 | 11/2008 |
| WO | WO-2008-153817 A2 | 12/2008 |
| WO | WO-2019-079625 A1 | 4/2019 |

* cited by examiner

METHODS AND CIRCUITS FOR STREAMING DATA TO PROCESSING ELEMENTS IN STACKED PROCESSOR-PLUS-MEMORY ARCHITECTURE

BACKGROUND

Modern computer processors are commonly "multi-core," which is to say that they include two or more separate processing units, or cores, spread across the chip area. In some architectures, the processing units are structured as regularly spaced "tiles." Tiled architectures work well for many applications, in part because they take advantage of parallelism and they avoid hot spots by evenly distributing computation and therefore power usage. Each tile/core/unit has access to its own memory bandwidth and capacity. A challenge presented by stacked processor-plus-memory architectures is that traditional memory controllers initialize processing units by writing to individually addressed registers. This procedure can be time-consuming and impose considerable overhead, reducing performance.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

Figure 1:
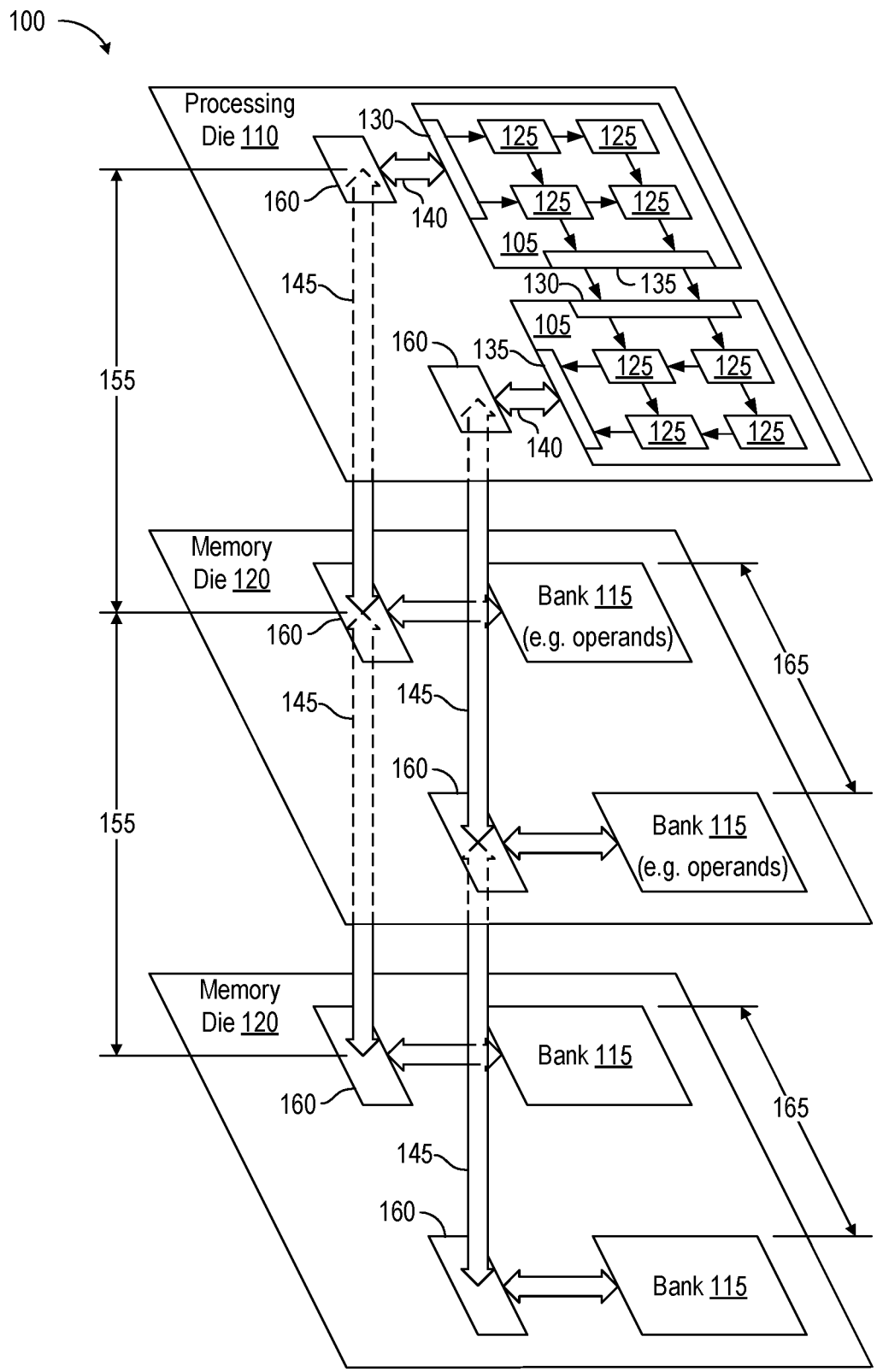
FIG. 1 illustrates a stacked processor-plus-memory device 100 that streamlines the manner of initializing processing elements in an artificial neural network.

FIG. 1 illustrates a stacked processor-plus-memory device 100 that streamlines the manner of initializing processing elements in an artificial neural network. Neural-network processing units 105 are instantiated on a processing die 110 and memory banks 115 are instantiated on memory dies 120 (e.g., DRAM dies). Stacking the dies allows processing units 105 to communicate with memory banks 115 over vertical connections that are short relative to horizontal inter-die connections so that dies 110 and 120 collectively behave as a single device. The stacked processor-plus-memory architecture also supports more inter-die connections than can easily be provided when dies are connected via pads placed around their perimeters.

Processing units 105 each include an array of processing elements (PE) 125 that perform computational functions on operands stored in respective PE registers (not shown) and operands from neighboring processing elements. Some of these operands are read from and written to banks 115. For fast, efficient access, processing-unit input and output ports 130 and 135 couple processing elements 125 to memory dies 115 via horizontal connections 140 and vertical connections 145 that lack synchronous storage elements. The resulting temporally continuous connections between memory dies 120 and processing elements 125 allow initialization data (operands) to be streamed sequentially into processing elements 125, expediting initialization and reducing power consumption. Processing elements 125 manage interruptions in data streamed from memory to accommodate variable latency for data delivered from memory dies 120. In DRAM embodiments, for example, processing elements 125 accommodate interruptions in streamed data that can occur due to the need to periodically refresh the DRAM.

As used herein, "processing element" refers to an electronic circuit that performs arithmetic and logic operations using local, on-die memory or data provided directly from one or more of the memory dies without being stored in local on-die memory, and sharing input, output, or both with an interconnected processing element. "Processing unit" refers to a collection of processing elements sharing control circuitry that provides access to remote, off-die memory. Device 100 includes an external interface (not shown) that allows an external controller to load memory banks 115 with instructions and data for processing on die 110. In one embodiment, processing die 110 includes a high-bandwidth memory (HBM) interface with access to four or eight DRAM dies stacked with a neural-network processor die. The HBM interface allows a host processor to write training instructions and data to the DRAM and read back inference-model and output data. HBM interfaces and their manner of use are well known.

Die separation 155 is exaggerated for illustrative purposes. Inter-die connectivity represented by connections 145 is established by via fields 160 (e.g. through-silicon vias or Cu—Cu connections) that interconnect bonded dies so that the stack behaves as a single IC. Other embodiments can have more or fewer processing dies or memory dies. Via fields 160 physically connect the dies so that the inter-die separation 155 is physically shorter than memory-bank pitch 165. Processing units 105 are laid out over banks 115 and thus have a similar in-plane pitch to the banks. Processing units 105 can thus have faster access to underlying banks 115 than to those that underlie neighboring processing elements.

Device 100 can include additional stacked dies for more processing power, memory, or both. Other types of dies might also be included. In some embodiments, for example, an optional base die is included to e.g. incorporate an HBM interface to provide external access to processor die 110 and memory dies 120, support test functions, distribute power, and change the stack's ballout from e.g. an in-stack ballout to external microbumps. These and other functions are distributed differently between the various dies in other embodiments.

Figure 2:
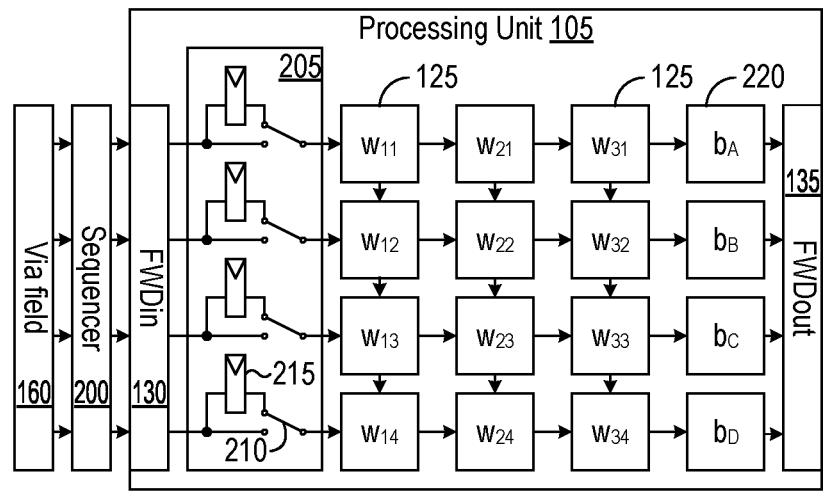
FIG. 2 depicts a pair of processing units 105 and 250 interacting with respective sequencers 200 and 260.
Figure 2:
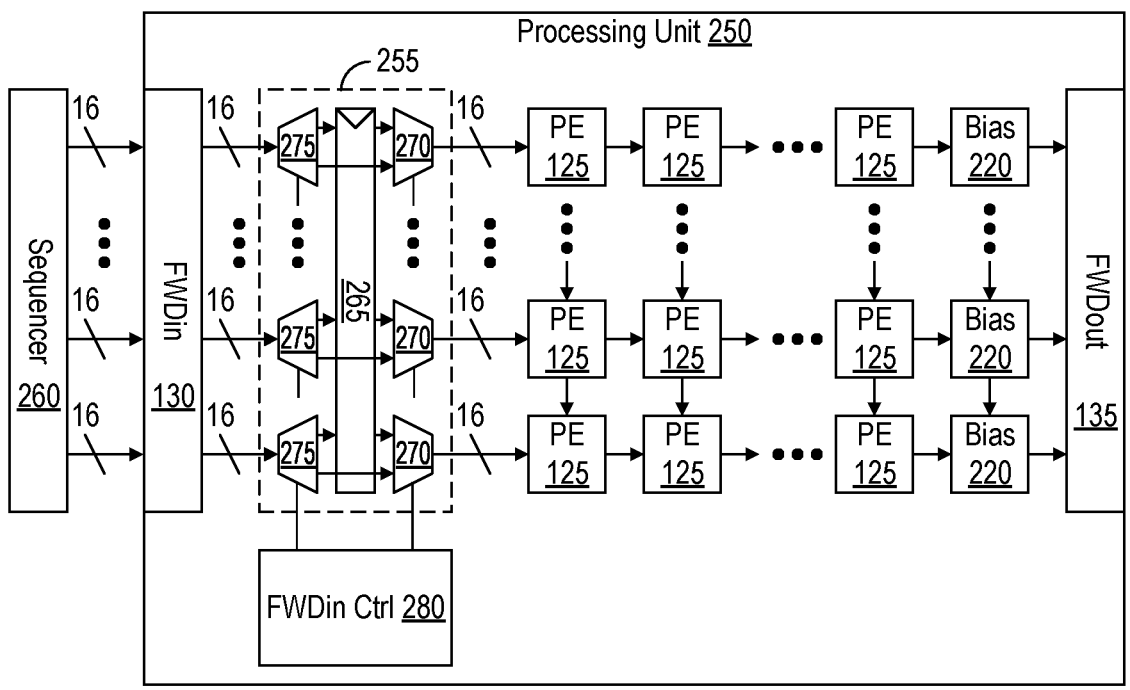

FIG. 2 depicts an embodiment of processing unit 105 introduced in FIG. 1 with a sequencer 200 interposed between via field 160 and forward input port 130. Sequencer 200 is a simple and efficient memory controller that manages the flow of data going to and from memory dies 120 using sequences of addresses to step through a microprogram. In this example, sequencer 200 can read instructions and operands from a sequence of addresses in memory banks 115 directly to forward input port 130. More complex controllers can be used in other embodiments.

A selectable buffer 205 in processing unit 105 includes switches 210 and sequential storage elements 215 that pass operands directed by sequencer 200 from memory either uninterrupted into the input ports of a systolic array of processing elements 125 or with a delay imposed by storage elements 215. Storage elements 215 can store values to be reused in subsequent computation. In some embodiments, data can be both stored in elements 215 and passed immediately and uninterrupted to processing elements 125. Buffer 205 can thus provide the first of processing elements 125 in each of the four series (rows) with fast, temporally continuous connections to memory banks 115 (FIG. 1).

Each processing element 125 is labeled here with a corresponding weight designation $W_{xy}$. These weights and other data (e.g. operands from memory and partial results from upstream processing elements) are stored in registers (not shown) within the processing elements. During initialization, weights $W_{xy}$ are transmitted in a stepwise fashion from one processing element to the next until each processing element 125 and bias element 220 is initialized. During operation, when processing unit 105 is operating as or as part of a neural network, each processing element 125 multiplies its respective weight operand by a second operand (e.g. an output from a previous neural network layer) and adds a partial result to form a new partial result that is sent downstream. The last processing element 125 in each row ultimately delivers its partial result to a bias element 220 that can add a bias term. Additional calculations, such as the application of activation functions and derivatives of activation functions to partial results, may also be performed but are omitted for brevity. Such additional calculations can be performed through the use of table lookups or arithmetic logic-unit (ALU) based calculations.

A practical processing unit can have many more processing elements and a practical neural network can have many more processing units. The bottom of FIG. 2 depicts an embodiment of a processing unit 250 with a selectable buffer 255 that feeds sixteen sixteen-bit operands to a sixteen-by-sixteen array of processing elements 125 from a sequencer 260. Sequential storage elements 265 are depicted collectively and switches for selectively bypassing sequential storage as paired multiplexers/demultiplexers 270 and 275. Local control circuitry 280 can direct selectable buffer 255 to steer incoming data directly to storage elements 265, directly to the processing-element array, or to both simultaneously. A more detailed discussion of a larger processing unit is presented below in connection with FIG. 6.

Sequential storage element 265 can act as a cache of addressable storage to feed processing elements 125 from the memory channel under control of sequencer 260. This cache can be implemented using e.g. static random-access memory, register files, and scratchpad buffers. This addressable storage allows data to be saved for reuse or fed directly into the array of processing elements. Each processing element 125 includes its own registers for local storage that are not independently addressable. This storage is collectively greater than the addressable space in storage element 265. Switches 270 and 275 bypass the cache for data that will not be reused, and in doing so avoid unnecessarily flushing data that may be needed later. In some embodiments, selectable buffer 255 can include scratchpad registers and other circuitry for e.g. normalizing incoming data before presentment to the processing-element array.

Selectable buffer 255 allows sequencer 260 to stream initialization data from memory directly and sequentially into processing elements 125, thus avoiding the dual tasks of first loading addressable memory (e.g. element 265) with operands and streaming those operands into the processing elements. The resultant simplicity makes the processing-element array vulnerable to interruptions of streaming data, as might occur due to refresh, activate, and precharge operations that occur in embodiments in which memory dies 120 (FIG. 1) are DRAM dies. Processing elements 125 include circuits, detailed below, that accommodate interruptions in streaming data with minimal overhead. The ability to accommodate interruptions avoids the need to divide data into chunks that fit within buffer 205, and thus reduces complexity, power use, and latency.

FIGS. 3A-3F illustrate how a 4×4 array 300 of processing elements 305 is loaded with four streams of weights and biases (operands), each of which includes a "bubble" 310 that represents a data interruption of one or more streaming period (e.g., a clock cycle). In other words, the sequence of incoming data includes consecutive operands (e.g. $W_{21}$ and $W_{31}$) and gapped operands separated from adjacent operands by a timing gap that is greater than the operand period (e.g. $W_{11}$ and $W_{21}$). Each processing element 305 belongs to one of four series of processing elements and is to be initialized with a respective weight or bias value (hereafter just "weight" or "operand"), so subsequent systolic array computations compute the proper results. To load these operands quickly and efficiently, processing elements 305 are configured to indicate which ones will be active in a given computation. The active processing elements are then put into a mode in which they will latch a designated operand and allow operands designated for downstream processing elements to pass. Any processing elements that will not participate in the computation have the option to simply turn transparent, or to block all data from flowing through them. In the example of FIGS. 3A-3F, all processing elements 305 are to participate in a subsequent computation and are thus to store a corresponding operand.

Figure 3A:
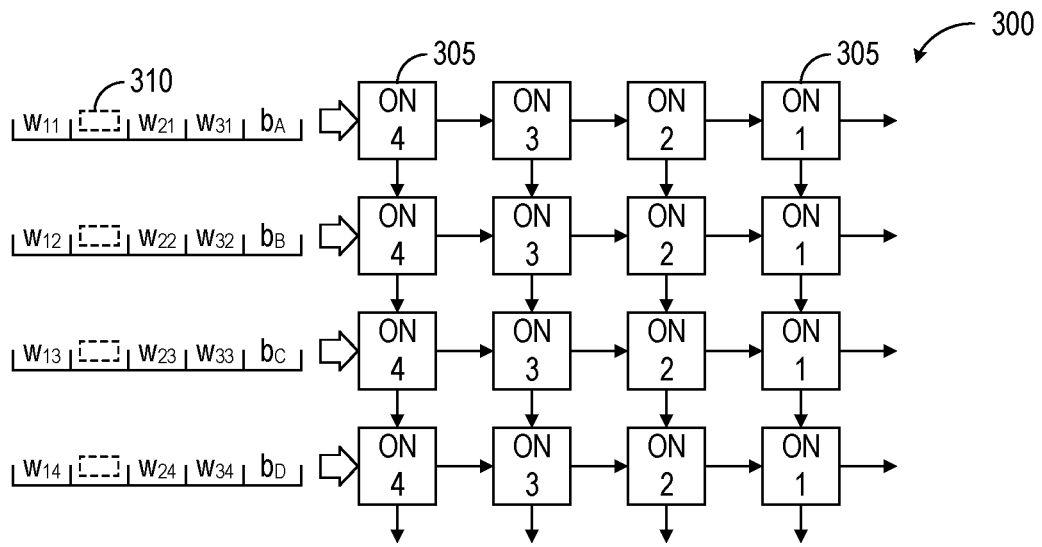
FIGS. 3A-3F illustrate how a 4×4 array 300 of processing elements 305 is loaded with four streams of weights and biases (operands), each of which includes a "bubble" 310 that represents a data interruption of one or more streaming period (e.g., a clock cycle).

Referring first to FIG. 3A, each processing element 305 is initialized to "ON," indicating the element is to participate in the upcoming computation, and with a count CNT of from one to four. As we will see, this count identifies which weight in the incoming stream should be stored within a given processing element and which should be passed along.

Figure 3B:
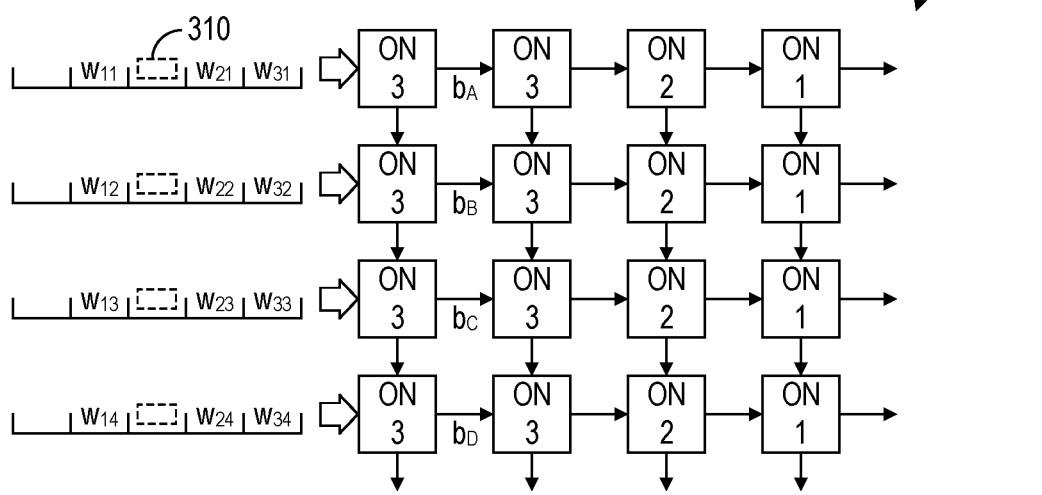

FIG. 3B shows the state of array 300 after one streaming period. The incoming weights have moved right one period. The leftmost processing elements 305 have decremented (from 4 to 3) and passed along their respective bias values to their immediately downstream neighbors.

Figure 3C:
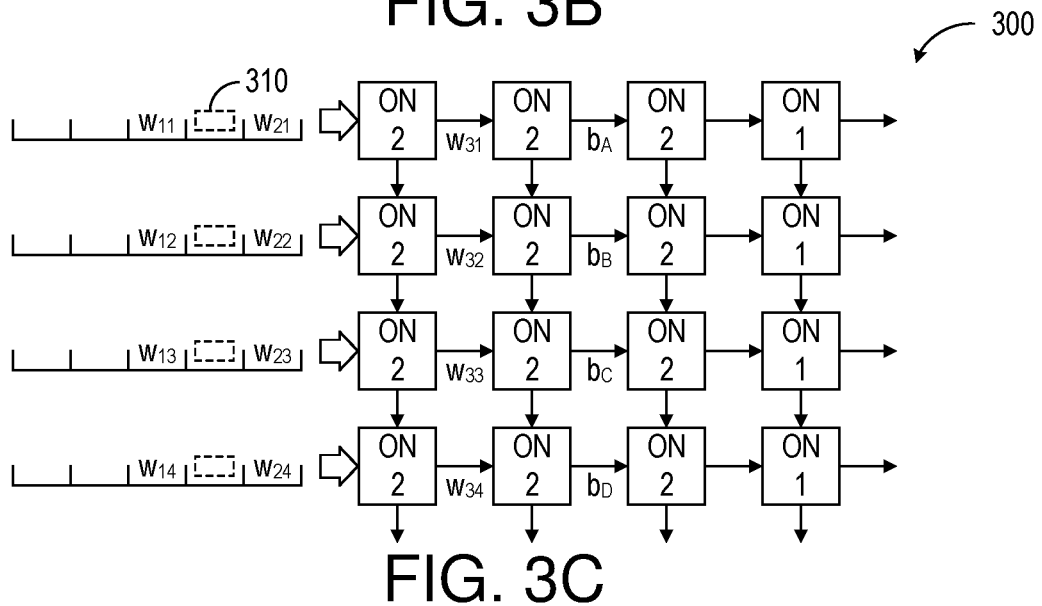

FIG. 3C shows the state of array 300 after two streaming periods. The incoming weights have moved right again, and the two leftmost sets of processing elements 305 have decremented (from 3 to 2) and passed along their respective weight and bias values to their immediately downstream neighbors.

Figure 3D:
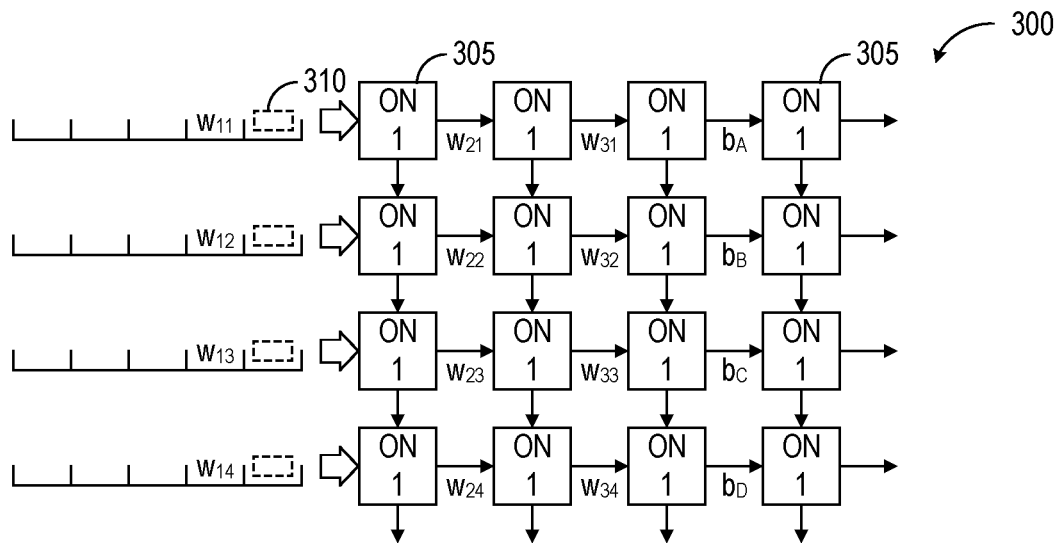

FIG. 3D shows the state of array 300 after three streaming periods. The incoming weights have moved right again, and the three leftmost sets of processing elements 305 have decremented (from 2 to 1) and passed along their respective weight and bias values to their immediately downstream neighbors. Every processing element is now in a state to store a value presented on its input. The leftmost processing elements are presented with a bubble, however.

Figure 3E:
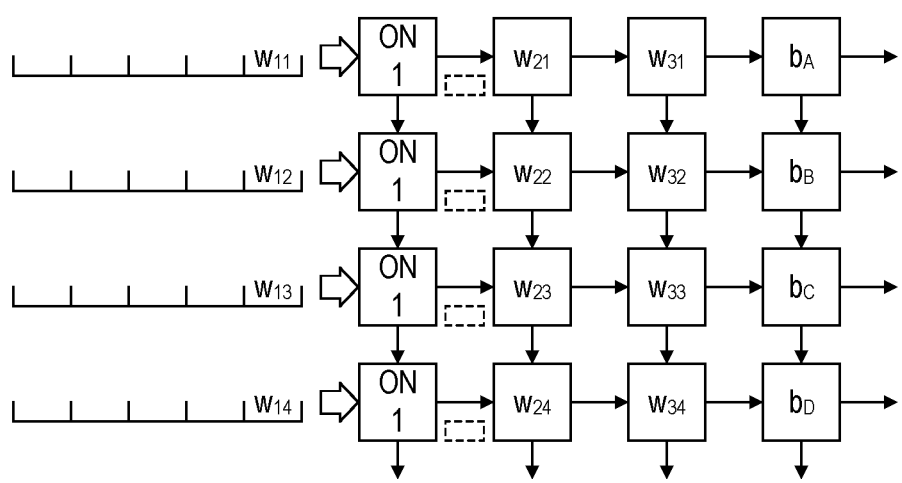

FIG. 3E shows the state of array 300 after four streaming periods. The incoming weights have moved right again. The rightmost three columns of processing elements 305 had decremented to one and were presented with valid weight and bias values and so captured those values. Processing elements 305 in the leftmost column were presented with bubbles 310 and so did not decrement, but rather waited for valid input. The bubbles propagating through the array are ignored.

Figure 3F:
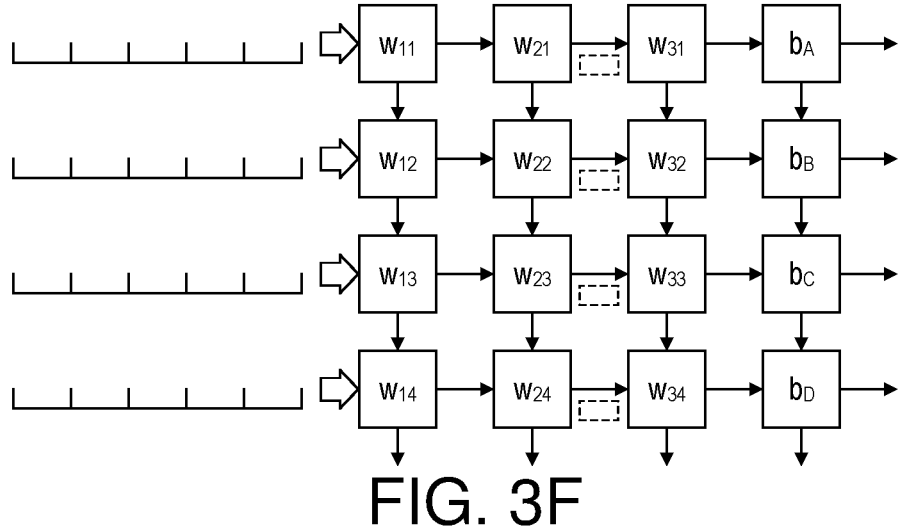

FIG. 3F shows the state of array 300 after five streaming periods. The last of the incoming weights are stored in the leftmost column of processing elements 305. The bubbles propagating through the array are once again ignored. Array 300 is now prepared to perform computations using the stored operands.

Figure 4:
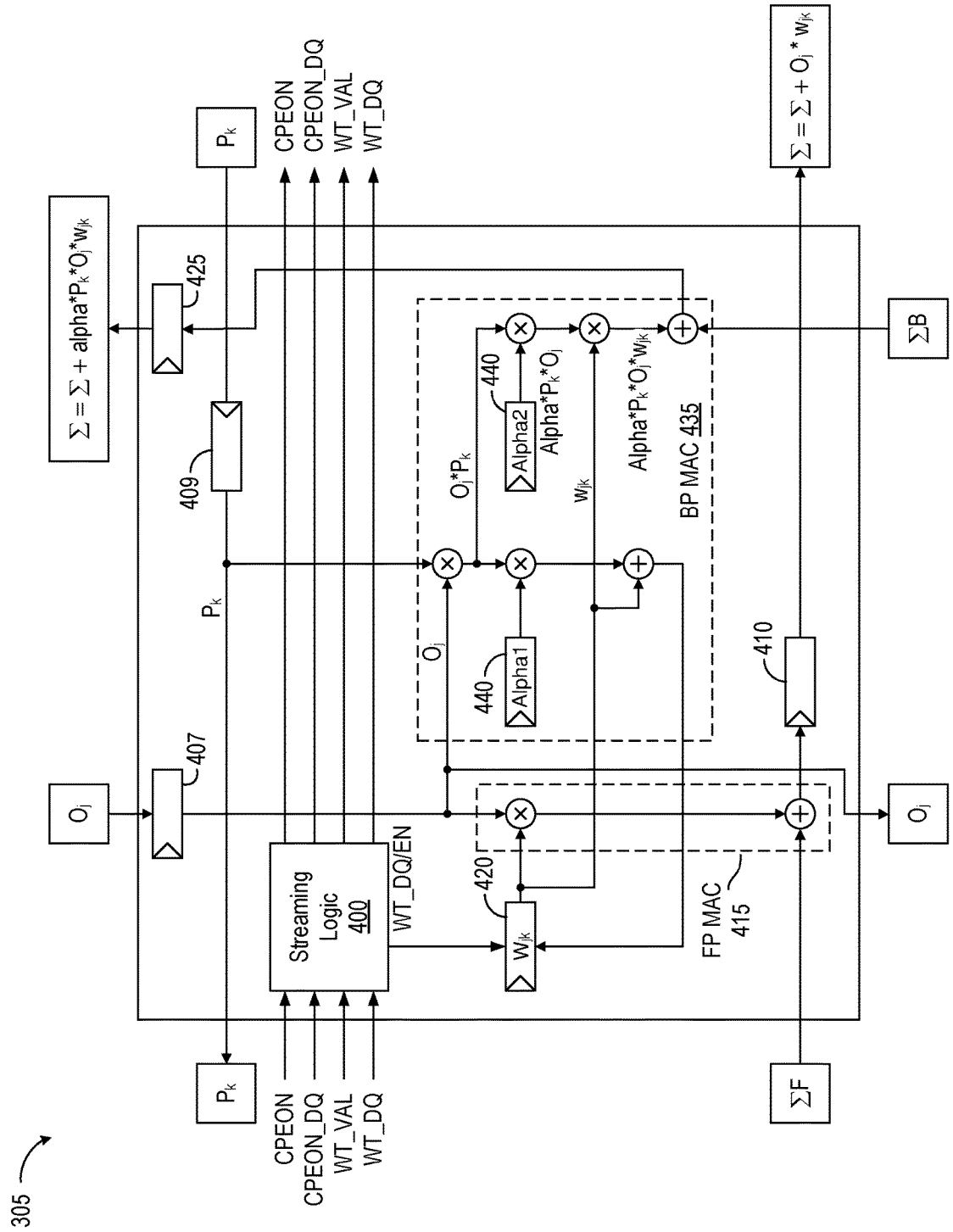
FIG. 4 depicts an embodiment of a processing element 305 with streaming logic 400 that manages the storage of streamed initialization data in the manner described above in connection with FIGS. 3A-3F.

FIG. 4 depicts an embodiment of a processing element 305 with streaming logic 400 that manages the storage of streamed initialization data in the manner described above in connection with FIGS. 3A-3F. Processing element 305 supports forward propagation for inference and back propagation for training. Storage elements for back propagation can be loaded using streaming methods of the type detailed herein but a detailed discussion is omitted for brevity.

Processing element 305 includes, as support for forward propagation, synchronous storage elements 407, 409, and 410; a forward-propagation multiply-accumulate (MAC) processor 415; and local processing-element storage 420 (a register) to store a weighting value, or weight $w_{jk}$, streamed into processing element 305 for calculating partial sums. Processor 415 calculates a forward partial sum and stores the result in storage element 410. In support of back propagation, processing element 305 includes a synchronous storage element 425, a back-propagation MAC 435, and local storage 440 to store values Alpha1 and Alpha2 that are used during training to update weight $w_{jk}$ in storage 420.

Streaming logic 400 receives as inputs four signals: "configure processing element on" signal CPEON instructs processing element 305 to configure itself as "ON" (participating in the subsequent computation); "configuration processing element on data" signal CPEON_DQ provides a value indicating the number of participating elements (e.g. the value 4 to the leftmost elements 305 in FIG. 3A); "weight-valid" signal WT_VAL is asserted to identify a valid weight; and "weight-data" signal WT_DQ provides a weight value that may be loaded into local storage 420 at initialization. Similar circuitry can be included to stream load local storage 440, though a detailed discussion of stream-loading for back propagation is omitted for brevity.

Forward propagation (inference) can be initiated once local storage 420 is loaded with a valid weight by streaming logic 400. To start, element 305 receives as inputs a first operand $O_j$ from memory or an upstream processing element and a second operand (e.g. a forward-propagation partial result F, if any, from an upstream processing element or memory). After one compute cycle, processing element 305 produces an updated partial result $\Box F = \Box F + O_j * w_{jk}$ and passes partial sum $O_j$ to a downstream processing element 305. In this context, "upstream" and "downstream" are defined with respect to the flow of operands during forward propagation, upstream being toward the source of data and downstream toward the destination.

Back propagation (training) updates the weight in local storage 420. Element 305 receives as inputs a partial sum Pk from a downstream element and a back-propagation partial result EB, if any, from a downstream processing element. After one compute cycle, processing element 305 produces an updated partial result $\Sigma B = \Sigma B + alpha * P_k * O_j * w_{jk}$ to an upstream processing element. Local storage 440 stores two learning-rate values Alpha1 and Alpha2, which can adjust back-propagation calculations differently e.g. by controlling how much to change the weight in response to estimated errors. The updated weight in local storage 420 can be streamed out of processing element 305 to memory dies 120 in a manner analogous to that provided by streaming logic 400 to load storage 420. The values in other registers can be similarly loaded and read. Processing elements can have more or fewer multipliers and adders in other embodiments. For example, processing element 305 can be simplified by reusing hardware (e.g., multipliers or adders), though such modification may reduce processing speed.

Figure 5A:
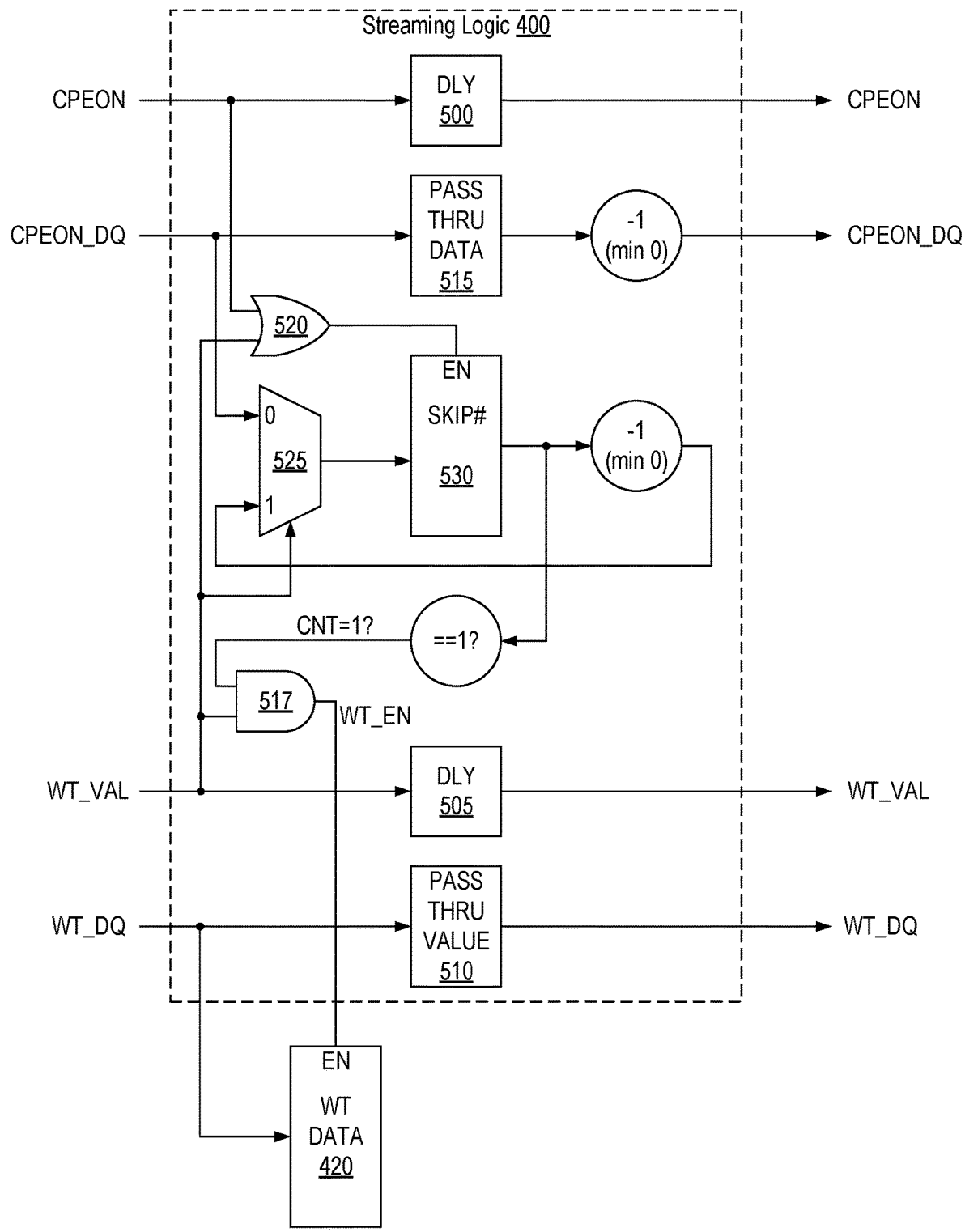
FIG. 5A illustrates an embodiment of streaming logic 400 and associated local weight storage 420 of processing element 305 illustrated in FIG. 4, the function of which is illustrated in FIGS. 3A-3F.

FIG. 5A illustrates an embodiment of streaming logic 400 and associated local weight storage 420 of processing element 305 illustrated in FIG. 4, the function of which is illustrated in FIGS. 3A-3F. Delay elements 500, 505, 508, and 510 pass respective signals CPEON, WT_VAL, WT_ID, and WT_DQ to a downstream processing element after one streaming period of delay. A fourth delay element 515 passes signal CPEON_DQ/ID CPEON_DQ to be decremented before being passed along as a modified count to streaming logic 400 on a downstream processing element. The remaining circuit elements load weight-data storage 420 as follows.

Valid weights and bubbles are conveyed as signal WT_DQ. An enable signal WT_EN from an AND gate 517 is asserted when the correct weight is applied to the input of storage 420. The correct weight is identified when signal WT_VAL is asserted, identifying a valid weight (as opposed to a bubble), and the valid weight is the one designated for the current instance of processing element 305 (CNT=1). The processing elements are readied for the streaming of weights by asserting signal CPEON (CPEON=1) and setting CPEON_DQ at a number indicative of the number of processing elements to receive the weights, four in the example of FIGS. 3A-3F, for one streaming period. Delay element 515 passes the value CPEON_DQ, decremented, to the downstream processing element. An OR gate 520 and multiplexer 525 enable a storage element 530 to store the value, or "skip number," expressed by signal CPEON_DQ for the current processing element, as the changed (decremented) skip number is passed on to the next processing element. This progression continues until the participating processing elements are "ON" and skip-numbered in the manner of FIG. 3A. Signals CPEON and CPEON_DQ are only valid for one cycle, so signal CPEON is deasserted for each processing element once configured for receipt of a weight. This ends the process of readying the storage elements for a stream of initialization data.

With streaming logic 400 readied, a stream of weights is presented as signal WT_DQ timed to weight-valid signal WT_VAL, the latter deasserted for streaming periods unaccompanied by valid weights (bubbles). By application of multiplexer 525 and storage element 530, the skip number is decremented for each valid weight presented as signal WT_DQ. When valid signal WT_VAL is presented for a skip number of one (CNT=1), AND gate 517 asserts weight-enable signal WT_EN to allow storage 420 to capture the current weight expressed on signal WT_DQ. This process proceeds until each processing element 305 to participate in the upcoming process is readied with the appropriate weight value, as illustrated in FIGS. 3B-3F.

Streaming logic 400 and the method it implements are relatively area and power efficient, allowing a processing die or dies to quickly stream initialization data from one or more memory dies into systolic arrays. Streaming logic 400 advantageously accommodates discontinuous data streams. Also advantageous, streaming logic 400 does not require global synchronization, instead using nearest-neighbor communication mechanisms inherent in systolic arrays to implement a streaming initialization process.

Figure 5B:
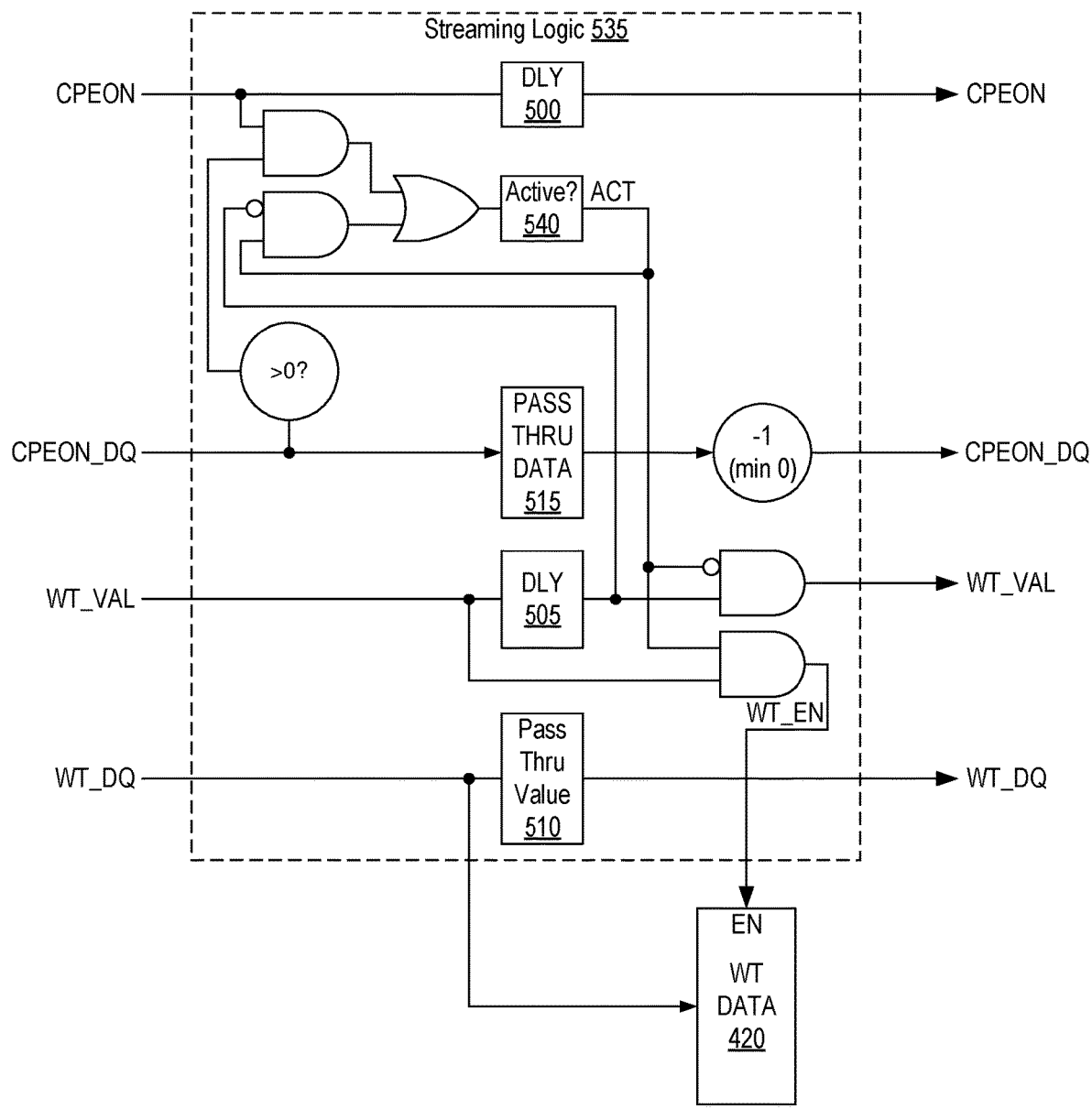
FIG. 5B depicts streaming logic 535 in accordance with another embodiment for updating associated local weight storage 420 of processing element 305 illustrated in FIG. 4.

FIG. 5B depicts streaming logic 535 in accordance with another embodiment for updating associated local weight storage 420 of processing element 305 illustrated in FIG. 4, with like-identified elements being the same or similar. Rather than loading the weight value for the last processing element first, as in the example of FIG. 5A, a series of processing elements, each with streaming logic 535, loads weights in local weight storage 420 sequentially from first processing element to last. Delay elements 500, 505, 510, and 515 work as before to pass respective signals CPEON, WT_VAL, WT_DQ, and CPEON_DQ to a downstream processing element after one streaming period of delay.

Signals CPEON and CPEON_DQ set the number N of active processing elements, which is to say the number of processing elements to receive a weight value in their respective weight storage 420. The value N is presented as signal CPEON_DQ to the first processing element and is thereafter decremented and passed downstream with one streaming period of delay. Signal CPEON is asserted for one streaming period. Each instance of streaming logic 535 for which signal CPEON_DQ is greater than zero while signal CPEON is asserted will have their active element 540 set to assert an active signal ACT. The output from active element 540 is fed back via AND and OR gates to maintain its active state after signal CPEON is deasserted. If signal CPEON_DQ reaches streaming logic 535 with a value less than one, active signal ACT will remain deasserted despite the assertion of signal CPEON. At the conclusion of this configuration stage, the first N processing elements will be active (ACT=1) and prepared to receive a weight value in storage 420.

To load weights into storage 420 of the N active processing elements, a stream of weight values arrives as signal WT_DQ accompanied by a weight-valid signal WT_VAL that is asserted (WT_VAL=1) for the first streaming period. Streaming logic 535 in the first processing element, with active signal ACT asserted, asserts weight-enable signal WT_EN to storage 420, enabling storage element 420 to store the valid weight value presented as signal WT_DQ. Weight values unaccompanied by an asserted weight-valid signal are ignored. Once asserted weight-valid signal WT_VAL propagates through delay element 505, the asserted signal resets active element 540 (ACT=0), which both prevents further updates of storage 420 and allows weight-valid signal WT_VAL to propagate downstream. This process of updating storage 420 repeats for each active downstream processing element.

Figure 5C:
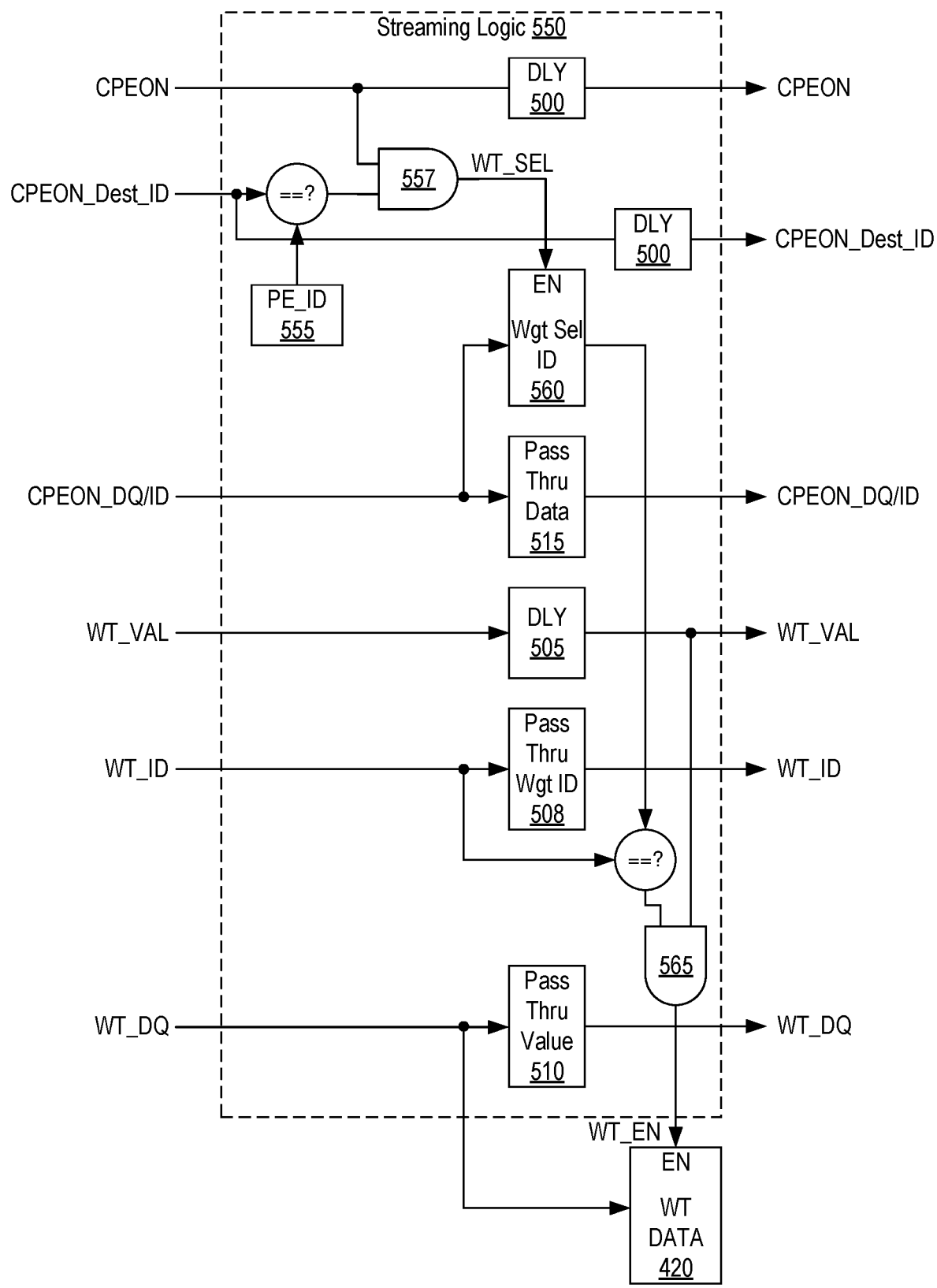
FIG. 5C depicts streaming logic 550 in accordance with another embodiment for updating associated local weight storage 420 of processing element 305 illustrated in FIG. 4.

FIG. 5C depicts streaming logic 550 in accordance with another embodiment for updating associated local weight storage 420 of processing element 305 illustrated in FIG. 4, with like-identified elements being the same or similar. This embodiment allows each processing element to be indexed for receipt of weight values. This indexing advantageously allows processing elements that share a weight value to be updated responsive to one instance of that value. For example, arrays of processing elements in which most weights are set to zero-so-called "sparse" arrays—are common in machine learning. Rather than streaming a zero for each such weight value, streaming logic 550 can send the same zero operand to all recipient processing elements.

Signals CPEON, CPEON_Dest_ID, and CPEON_DQ/ID are employed during configuration, the process during which each processing element is prepared for the receipt of a weight value. Streaming logic 550 is programmed or hard-wired with an identifier 555 that distinguishes the associated processing element from other such elements within a processing unit. During configuration, when the processing elements are prepared for receipt of weight values, signal CPEON is asserted and accompanied by a stream of processing-element identifiers CPEON_Dest_ID and operand (e.g. weight value) identifiers CPEON_DQ/ID. If signal CPEON is asserted and the concomitant destination ID matches that of the processing element (i.e., CPEON_Dest_ID=PE_ID), an AND gate 557 asserts a weight-select signal WT_SEL to enable a register 560 to capture the current value of signal CPEON_DQ/ID. This captured value will later alert streaming logic 550 to an incoming weight value destined for local storage 420.

Signal CPEON_Dest_ID designates each processing element to be activated. In one embodiment, for example, CPEON_Dest_ID is a sixteen-bit binary value that asserts a one for each of sixteen processing elements that will share an incoming weight value. Identifier 555 in each processing element is a sixteen-bit binary value with a single binary one in a bit position that distinguishes it from the other fifteen elements. To designate every second processing element of sixteen elements as recipients of the same subsequently applied weight values, for example, signal CPEON_Dest_ID can be set to 0101010101010101 so that register 560 in every other processing element includes the same weight identifier. Registers 560 in the remaining processing elements can be similarly loaded individually or in groups. Registers 560 can be set to e.g. zero for inactive processing elements.

With each active processing element loaded with a weight-select ID in register 560, operands are sequenced through processing elements as a stream of weight values on signal WT_DQ, each operand accompanied by an operand identifier WT_ID and a weight-value signal WT_VAL that distinguishes valid weight values from bubbles. As illustrated by an AND gate 565, valid operands for which the accompanying operand identifier WT_ID matches that stored in register 560 assert weight-enable signal WT_EN to store the current operand expressing a weight value on signal WT_DQ in storage 420. In this way a single operand/operand-ID pair propagating through an array of processing elements can update any number of processing elements that share an operand (e.g. that are to apply the same weight value).

Figure 6:
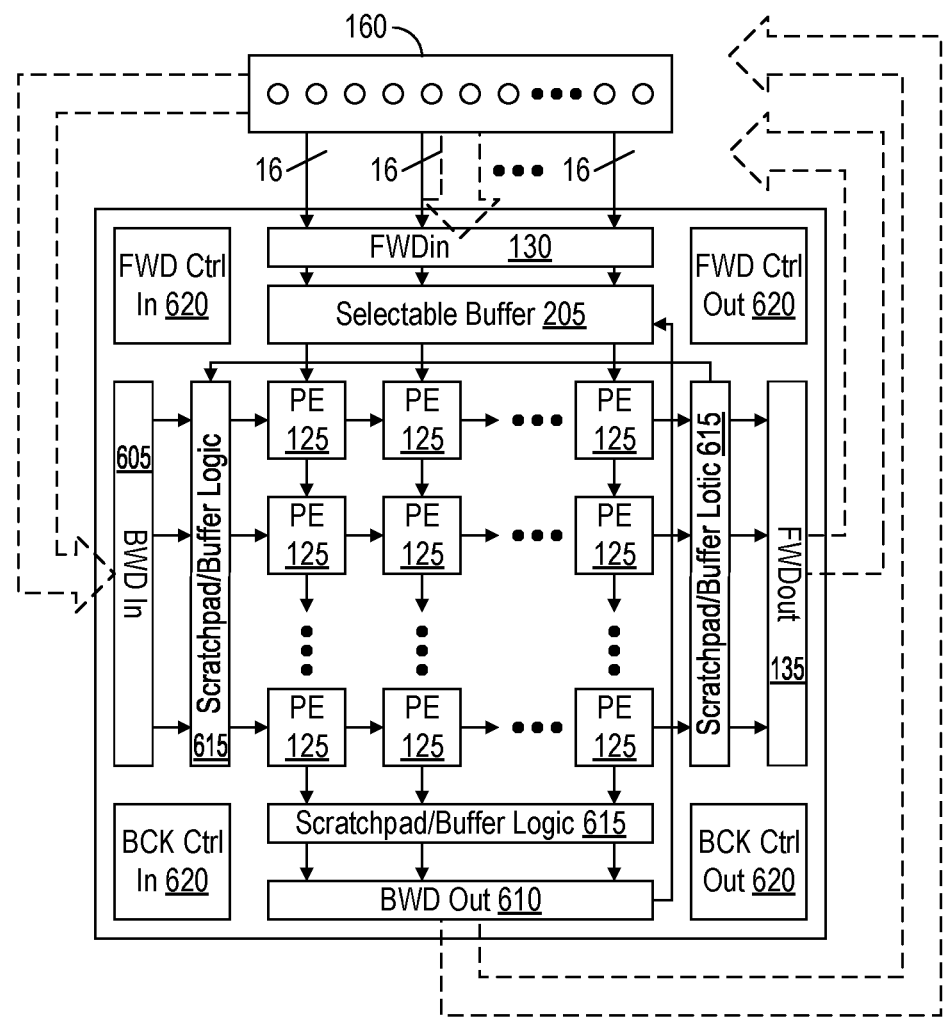
FIG. 6 illustrates a processing unit 600, also called a processing tile, in accordance with another embodiment implemented with a systolic array of processing elements 125.

FIG. 6 illustrates a processing unit 600, also called a processing tile, in accordance with another embodiment implemented with a systolic array of processing elements 125 (e.g., of a neural network). Systolic arrays tend to be power efficient and simple but other types and arrangements of processing elements can be used.

This example includes a 16×16 array of processing elements 125 that perform pipelined back propagation in the manner discussed in connection with FIG. 4 for neural-network training. Simultaneous forward and back propagation improves training time and resource utilization (the mathematics of pipelined back propagation are well known). Along each edge of the processing tile are the forward input and output ports 130 and 135 introduced previously and backward input and output ports 605 and 610 to similarly support back propagation. Next to each input/output port is a scratchpad/buffer storage element 615, an instance of which can be incorporated into selectable buffer 205.

Though not shown, the edges of the tile can likewise include simple logic that can implement e.g. activation functions and derivatives of activation functions. Instances of scratchpad/buffer logic 615 are interconnected to route data from the output sides of processing unit 600 to input sides so that data can be reused for e.g. certain types of neural-network calculations.

Processing unit 600 includes, in each corner, a control block 620 that configures and controls how ports 130, 135, 605, and 610 and related selectable buffer 205 and scratchpad/buffer logic 615 function to load operands and perform a particular set of calculations. Also associated with processing unit 600, via field 160 provides a low-latency memory channel to underlying memory die(s). Such vertical channels can provide input data to the forward and backward propagation input ports 130 and 605 and can accept data from the forward and backward propagation output ports 135 and 610. This functionality allows input data to be streamed from memory to processing elements 125 and for results from the processing elements to be streamed back into memory.

While the foregoing discussion contemplates the integration of neural-network processor die with DRAM memory, other types of tightly integrated processors and memory can benefit from the above-described methods and circuits for streaming values into arrays of processing elements. Other variations of these embodiments will be apparent to those of ordinary skill in the art upon reviewing this disclosure. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. An integrated circuit (IC) device comprising:
   a memory die having memory to store operands of initialization data; and
   a processor die bonded to the memory die and having:
     a sequencer coupled to the memory die to read a sequence of the operands from the memory, wherein some of the operands in the sequence are separated in time by an operand period and at least one other of the operands in the sequence is separated from another of the operands in the sequence by a timing gap that is greater than the operand period, the timing gap caused by an interruption in streaming the sequence of the operands to perform at least one refresh, active, or precharge operation on the memory die; and
     a series of processing elements communicatively coupled to the sequencer to store the sequence, each processing element to store one of the operands in the sequence of the operands.

2. The IC device of claim 1, each processing element including processing-element storage to store a corresponding one of the operands and streaming logic to disable the processing-element storage responsive to the timing gap.

3. The IC device of claim 2, the streaming logic further comprising a delay element to pass operands of the sequence to a subsequent one of the processing elements after the operand period.

4. The IC device of claim 1, the processor die further having a second series of processing elements communicatively coupled to the sequencer to store a second sequence of operands.

5. The IC device of claim 4, wherein each processing element in the first-mentioned series of processing elements is connected to a corresponding one of the processing elements in the second series of processing elements.

6. The IC device of claim 5, wherein the processing elements form a systolic array.

7. The IC device of claim 5, each processing element of the second series of processing elements including a multiply-accumulate processor to multiply the stored operand by a second operand from the corresponding one of the processing elements in the first-mentioned series of processing elements.

8. The IC device of claim 1, the processor die further having a selectable buffer between the sequencer and the series of processing elements, the selectable buffer to selectively impose a delay on the sequence of the operands from the sequencer.

9. A method of streaming operands of initialization data from a memory die into a series of processing elements, the method comprising:
   streaming a first subset of the operands of the initialization data from the memory die;
   interrupting the streaming to perform at least one of a refresh, activate, or precharge operation on the memory die;
   sequencing the first subset of the operands of the initialization data into the series of processing elements over a first number of operand periods;
   streaming a second subset of the operands of the initialization data from the memory die after the interrupting; and
   sequencing the second subset of the operands of the initialization data into the series of processing elements over a second number of operand periods, the second subset of the operands separated from the first subset of the operands in the sequencing by a timing gap greater than the operand period.

10. The method of claim 9, further comprising:
    initializing each of the processing elements to store a skip number;
    changing the skip number at each processing element for each of the operands presented to the processing element; and
    at each of the processing elements presented with a current one of the operands:
      comparing the skip number to a reference; and
      if the skip number matches the reference, storing the current one of the operands in the processing element.

11. The method of claim 10, further comprising, at each of the processing elements presented with the current one of the operands, passing the current one of the operands to a downstream one of the processing elements if the skip number does not match the reference.

12. The method of claim 10, wherein the reference is the same for each of the processing elements.

13. The method of claim 10, wherein the initializing of the processing element to store the skip numbers comprises passing a first skip number to a first of the processing elements, changing the first skip number to a second skip number, and passing the second skip number to a downstream one of the processing elements.

14. The method of claim 10, further comprising streaming a valid signal through the processing elements, the streaming asserting the valid signal at each of the processing elements for the first of the operands and the second of the operands and deasserting the valid signal for the gap.

15. The method of claim 14, further comprising, at each of the processing elements, storing the current one of the operands in the processing element if the skip number matches the reference and the valid signal is asserted and ignoring another of the operands if the skip number matches the reference and the valid signal is deasserted.

16. A method of initializing a series of processing elements with a stream of operands from a memory die, the method comprising:
   initializing each of the processing elements with a respective stored operand identifier;
   streaming a first subset of the operands from the memory die;
   interrupting the streaming to perform at least one of a refresh, activate, or precharge operation on the memory die;
   streaming a second subset of the operands from the memory die;
   sequencing the first and second subsets of the operands through the processing elements, each operand paired with a corresponding streamed operand identifier; and
   at each of the processing elements presented with one of the operands:
      comparing the stored operand identifier with the streamed operand identifier; and
      if the stored operand identifier matches the streamed operand identifier, storing the one of the operands paired with the matching streamed operand identifier.

17. The method of claim 16, further comprising, at each of the processing elements presented with a gap between the first and second subsets of the operands, holding the last operand presented to the processing element.

18. The method of claim 17, further comprising, at each of the processing elements presented with a gap between the first and second subsets of the operands, shifting out the last operand presented to the processing element and storing the first operand of the second subset of the operands.

19. The method of claim 18, wherein sequencing the first and second subsets of the operands through the processing elements comprises transmitting the operands in a stepwise fashion from one processing element to the next.

* * * * *